(12) United States Patent
Hodono

(10) Patent No.: US 7,912,332 B2
(45) Date of Patent: Mar. 22, 2011

(54) MANUFACTURING METHOD OF OPTICAL WAVEGUIDE DEVICE AND OPTICAL WAVEGUIDE DEVICE OBTAINED THEREBY

(75) Inventor: Masayuki Hodono, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 117 days.

(21) Appl. No.: 12/266,120

(22) Filed: Nov. 6, 2008

(65) Prior Publication Data

US 2009/0116799 A1 May 7, 2009

Related U.S. Application Data

(60) Provisional application No. 60/989,267, filed on Nov. 20, 2007.

(30) Foreign Application Priority Data

Nov. 6, 2007 (JP) .................................. 2007-288397

(51) Int. Cl.
*G02B 6/26* (2006.01)
*G02B 6/42* (2006.01)
*G02B 6/30* (2006.01)

(52) U.S. Cl. ............. 385/52; 385/49; 385/130; 385/131
(58) Field of Classification Search ....................... 385/52
See application file for complete search history.

(56) References Cited

U.S. PATENT DOCUMENTS

| | | | | |
|---|---|---|---|---|
| 4,750,799 A | * | 6/1988 | Kawachi et al. | 385/14 |
| 6,019,523 A | * | 2/2000 | Honmou | 385/94 |
| 6,075,911 A | * | 6/2000 | Goto | 385/31 |
| 6,435,734 B2 | * | 8/2002 | Okada et al. | 385/88 |
| 6,735,366 B2 | * | 5/2004 | Goto | 385/49 |
| 2001/0009597 A1 | * | 7/2001 | Alibert | 385/52 |
| 2002/0067892 A1 | | 6/2002 | Oguro | |
| 2002/0181882 A1 | | 12/2002 | Hibbs-Brenner et al. | |
| 2004/0022499 A1 | | 2/2004 | Shimizu et al. | |

FOREIGN PATENT DOCUMENTS

| | | |
|---|---|---|
| EP | 0889533 A2 | 1/1999 |
| EP | 1120672 A1 | 8/2001 |
| EP | 1211539 A2 | 6/2002 |
| JP | 02050106 A * | 2/1990 |
| JP | 11337775 A * | 12/1999 |
| JP | 2005-134444 A | 5/2005 |
| WO | 2007/010184 A1 | 1/2007 |

OTHER PUBLICATIONS

European Search Report dated Jan. 20, 2009, issued in corresponding European Patent Application No. 08019190.1.

* cited by examiner

*Primary Examiner* — Michelle R Connelly Cushwa
(74) *Attorney, Agent, or Firm* — Westerman, Hattori, Daniels & Adrian, LLP

(57) ABSTRACT

A manufacturing method of an optical waveguide device which is capable of easily and precisely aligning the optical axis of a light receiving and emitting element and the optical axis of an optical waveguide and capable of shortening manufacturing time, and to provide an optical waveguide device obtained thereby. An under cladding layer 11 is formed on an upper surface of a substrate 10. A core layer 16 is formed on an upper surface of the under cladding layer 11. Horizontal alignment guides 17 made of the same material as the above-mentioned core layer 16 are formed on the above-mentioned substrate 10. A light emitting element 19 is installed on the substrate 10 along the horizontal alignment guides 17.

2 Claims, 4 Drawing Sheets

PRIOR ART

MANUFACTURING METHOD OF OPTICAL WAVEGUIDE DEVICE AND OPTICAL WAVEGUIDE DEVICE OBTAINED THEREBY

RELATED APPLICATIONS

This application claims the benefit of U.S. Provisional Application No. 60/989,267, filed Nov. 20, 2007, which is hereby incorporated by reference.

BACKGROUND OF THE INVENTION

1. Field of the Invention

The present invention relates to a manufacturing method of an optical waveguide device for widespread use in optical communications, optical information processing and other general optics, and an optical waveguide device obtained thereby.

2. Description of the Related Art

In general, an optical waveguide device achieves optical coupling by causing an optical waveguide to propagate a light beam emitted from a light emitting element or causing a light receiving element to receive a light beam propagated by the optical waveguide. The optical waveguide device has a structure, for example, as shown in FIG. 8. This optical waveguide device includes a light emitting element 2 disposed and fixed on a substrate 1, and an optical waveguide including an under cladding layer 3, a core layer 4 and an over cladding layer 5, in which a light beam propagates as indicated by an arrow.

For such an optical waveguide device, it is important to precisely align the optical axis of the light emitting element 2 and the optical axis of the core layer 4 with each other for the purpose of reducing optical coupling losses, so that an exact position adjustment is made thereto in two directions (a horizontal direction and a vertical direction) perpendicular to the optical axes. This, however, necessitates a special member for the above-mentioned position adjustment and requires tremendous labor to make the position adjustment, thereby presenting the problem of an increase in assembly cost.

To solve the problem, as an example, there has been disclosed an optical waveguide module serving as a light receiving and emitting element and including an alignment mark for reflecting or absorbing a position adjustment light beam at a position spaced a predetermined distance apart from a light receiving and emitting portion thereof (see, for example, JP-A-2005-134444).

The above-mentioned optical waveguide module has an advantage in that there is no need to use a special member for the position adjustment, but still requires the operation of making the position alignment by using the alignment mark of the light receiving and emitting element as a guide. Thus, the above-mentioned optical waveguide module has not solved the problem in the labor required to make the position adjustment.

SUMMARY OF THE INVENTION

In view of the foregoing, it is an object of the present invention to provide an excellent manufacturing method of an optical waveguide device which is capable of easily and precisely aligning the optical axis of a light receiving and emitting element and the optical axis of an optical waveguide and capable of shortening manufacturing time, and to provide an optical waveguide device obtained thereby.

To accomplish the above-mentioned object, a first aspect of the present invention is intended for a method of manufacturing an optical waveguide device, which comprises the steps of: forming an under cladding layer on an upper surface of a substrate; forming a core formation material layer over an upper surface of said under cladding layer and a future light receiving and emitting element area on the upper surface of the substrate; partially hardening said core formation material layer and removing an unhardened portion to form a core layer having a light receiving surface or a light emitting surface and to form a horizontal alignment guide for light receiving and emitting element installation at the same time as the core layer; and installing a light receiving and emitting element on the substrate along said horizontal alignment guide.

A second aspect of the present invention is intended for the method of manufacturing the optical waveguide device, which further comprises the step of sealing with resin the light receiving and emitting element installed on said substrate and at least the light receiving surface or the light emitting surface of the core layer to form a light propagation layer. A third aspect of the present invention is intended for the method of manufacturing the optical waveguide device, wherein said sealing with resin is done by using the same material as a core formation material which constitutes the core formation material layer.

A fourth aspect of the present invention is intended for an optical waveguide device produced by the method recited in the first aspect, which is characterized in that: an under cladding layer is formed on an upper surface of a substrate; a core layer including a light receiving surface or a light emitting surface is formed on an upper surface of the under cladding layer; a horizontal alignment guide for light receiving and emitting element installation made of the same material as that of said core layer is formed on said substrate; and a light receiving and emitting element is installed on the substrate along the horizontal alignment guide.

A fifth aspect of the present invention is intended for the optical waveguide device, wherein the light receiving and emitting element installed on said substrate and at least the light receiving surface or the light emitting surface of the core layer are sealed with resin, whereby a light propagation layer is formed.

The present inventor has diligently made studies of a method of aligning the light receiving and emitting element and the optical waveguide with each other easily and precisely without the use of any special member. As a result, the present inventor has made a discovery that the formation of the alignment guide for the alignment of the light receiving and emitting element and the optical waveguide with each other by using the core formation material layer at the same time as the formation of the core layer of the optical waveguide allows the determination of the position of the above-mentioned alignment guide relative to a light propagation end surface of the core layer precisely and easily, to thereby accomplish the positioning of the light receiving and emitting element precisely without any labor. Thus, the present inventor has attained the present invention.

In the method of manufacturing the optical waveguide device according to the present invention, as described above, the alignment guide for the alignment of the light receiving and emitting element and the optical waveguide with each other are formed by using the core formation material layer at the same time as the formation of the core layer of the optical waveguide. This eliminates the need to prepare an additional alignment member. Additionally, the position of the above-mentioned alignment guide relative to the light propagation end surface of the core layer is determined precisely and easily during the manufacture of a photomask and the like.

This is advantageous in accomplishing the positioning of the light receiving and emitting element with high precision.

In particular, the above-mentioned manufacturing method which further comprises the step of sealing with resin the light receiving and emitting element installed on said substrate and at least the light receiving surface or the light emitting surface of the core layer to form the light propagation layer accomplishes the positioning thereof more easily because the light beam is transmitted via the above-mentioned light propagation layer if there is a slight misalignment between the above-mentioned light receiving and emitting element and the light receiving surface or the light emitting surface of the core layer. In particular, the manufacturing method in which the sealing with resin is done by using the same material as the core formation material is preferred because the light propagation layer formed by the above-mentioned sealing with resin has the exactly the same refractive index as the core layer to minimize optical coupling losses.

Further, the optical waveguide device according to the present invention is capable of transmitting light beams of high intensity because precise positioning of the optical axis thereof is accomplished for optical coupling.

In particular, the above-mentioned optical waveguide device wherein the light receiving and emitting element installed on said substrate and at least the light receiving surface or the light emitting surface of the core layer are sealed with resin whereby the light propagation layer formed is capable of achieving particularly low optical coupling losses and transmitting light beams of higher intensity.

DETAILED DESCRIPTION

An example of the manufacture of an optical waveguide device including a light emitting element and an optical waveguide which are optically coupled to each other is described in detail as an instance of the present invention.

Figure 1:
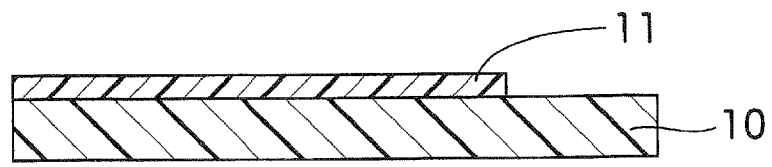
FIG. 1 is a view schematically illustrating a manufacturing step of an optical waveguide device according to one preferred embodiment of the present invention.

According to this instance, a substrate 10 of a flat shape is initially prepared, and an under cladding layer 11 is formed in a predetermined region of an upper surface of the substrate 10, as shown in FIG. 1.

A material for the formation of the above-mentioned substrate 10 preferably has a low CTE (coefficient of thermal expansion) and resistance to solvents, and also preferably has a certain thickness and certain rigidity in the light of handling. Specific examples of the material for the formation of the above-mentioned substrate 10 include glass, quartz, silicon, resins, metals and the like. The thickness of the substrate 10 is appropriately determined depending on the material and required characteristics thereof. When the substrate 10 is made of, for example, polyester resins (PET), polycarbonate resins (PC), polyethylene naphthalate resins (PEN) or the like, the substrate 10 preferably has a thickness typically in the range of 50 to 300 μm. When the substrate 10 is a glass substrate or a quartz substrate, the substrate 10 preferably has a thickness typically in the range of 1 to 5 mm.

A varnish prepared by dissolving a photosensitive resin, a polyimide resin, an epoxy resin and the like in a solvent is used as a material for the formation of the above-mentioned under cladding layer 11. The above-mentioned varnish is applied onto the substrate 10, for example, by a spin coating method, a dipping method, a casting method, an injection method, an ink jet method and the like, and is then hardened to provide the under cladding layer 11.

When a photosensitive resin is used as the material for the formation of the under cladding layer 11, the hardening is achieved by irradiating the photosensitive resin with ultraviolet light and the like so that a predetermined region thereof is exposed to the ultraviolet light and the like. The dose of the ultraviolet light is typically 10 to 10000 $mJ/cm^2$, preferably 50 to 3000 $mJ/cm^2$. When a polyimide resin is used as the material for the formation of the under cladding layer 11, the hardening is typically achieved by a heating treatment at 300° C. to 400° C. for 60 to 180 minutes.

Figure 7:
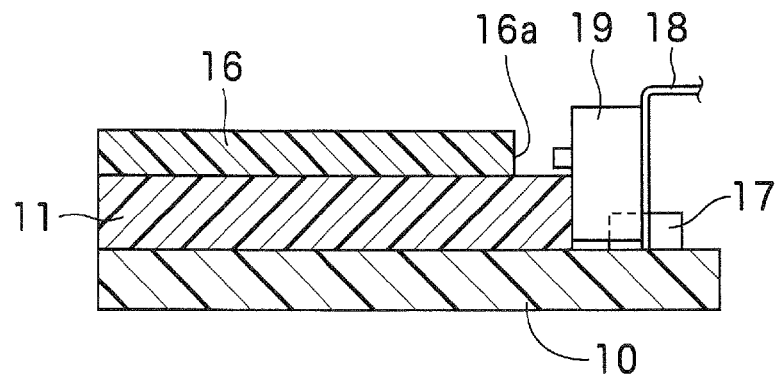
FIG. 7 is a view schematically illustrating another form of the optical waveguide device provided according to the present invention.
Figure 8:
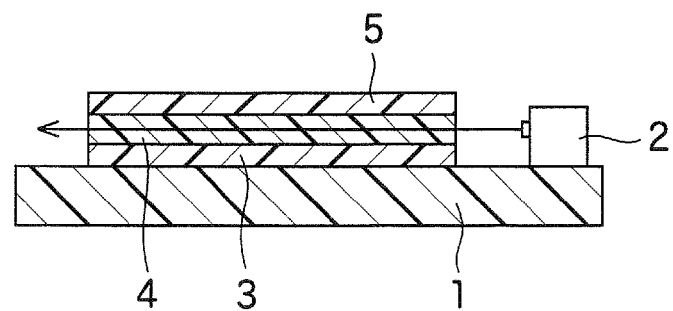
FIG. 8 is a sectional view schematically showing a background art optical waveguide device.

The above-mentioned under cladding layer 11 preferably has a thickness in the range of 25 to 300 μm. In general, the thickness of the under cladding layer 11 is determined so that the optical axis of a core layer 16 (see FIG. 7) and the optical axis of a light emitting element 19 are at the same height, in consideration for the height of the core layer 16 and the height of the light emitting element 19. According to the present invention, however, a light propagation layer is formed (see FIG. 5) by resin sealing between a light receiving surface 16a of the above-mentioned core layer 16 and the light emitting element 19, which is described later. This is based on the consideration of the fact that the light emitting element 19 generally has variations of approximately ±25 μm in size because a wafer is divided into chips by dicing. Making the core layer 16 and the light emitting element 19 equal in height in design allows the above-mentioned resin sealing to accommodate errors corresponding to the variations in size.

Figure 2B:
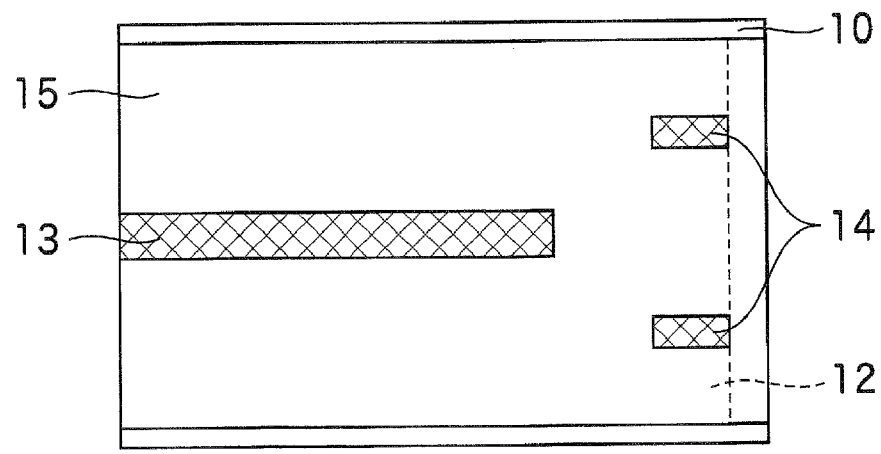
FIG. 2B is a plan view of FIG. 2A.
Figure 2A:
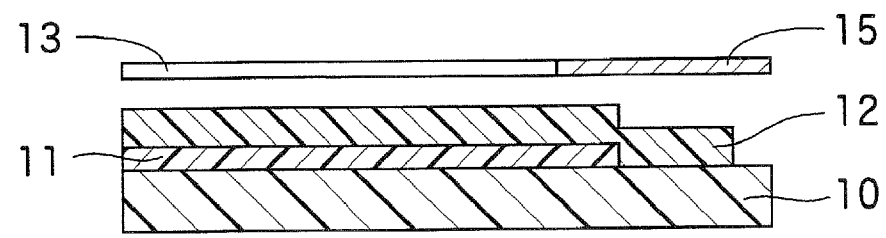
FIG. 2A is a view schematically illustrating a manufacturing step of the above-mentioned optical waveguide device.

Next, as shown in FIG. 2A, a core formation material is applied over an upper surface of the above-mentioned under cladding layer 11 and a future light emitting element area on the upper surface of the substrate 10 to form a core formation material layer 12.

A varnish prepared by dissolving a photosensitive resin in a solvent is typically used as the above-mentioned core formation material. The core formation material, however, is required to provide the resultant core layer 16 having a refractive index greater than that of the above-mentioned under cladding layer 11 and that of an over cladding layer 21 (see FIG. 6) to be described later. The adjustment of the above-mentioned refractive index may be made, for example, by adjusting the selection of the types of the materials for the formation of the above-mentioned under cladding layer 11, the core layer 16 and the over cladding layer 21 and the compositions thereof.

The formation of the above-mentioned core formation material layer 12 is accomplished by applying a varnish serving as the core formation material with a predetermined thickness over the upper surface of the above-mentioned under cladding layer 11 and the future light emitting element area on the upper surface of the substrate 10, for example, by a spin coating method, a dipping method, a casting method, an injection method, an ink jet method and the like in a manner similar to the formation of the above-mentioned under cladding layer 11. Thereafter, a heating treatment is typically performed at 50° C. to 120° C. for 10 to 30 minutes to harden the above-mentioned core formation material layer 12.

Next, as shown in FIG. 2B which is a plan view of FIG. 2A, the above-mentioned core formation material layer 12 is covered with a photomask 15 provided with opening patterns 13 and 14 (indicated by the cross-hatched areas in FIG. 2B) for hardening only required portions by photoreaction, and is exposed to irradiation light through the photomask 15. A portion exposed to the light through the above-mentioned opening pattern 13 becomes the core layer 16 constituting the optical waveguide, and portions exposed to the light through the above-mentioned opening patterns 14 become a pair of left-hand and right-hand horizontal alignment guides 17 for light emitting element installation (see FIGS. 3A and 3B). The arrangement of the above-mentioned opening patterns 13 and 14 is precisely positioned so that the optical axis of a light beam emitted from the light emitting element 19 installed on the upper surface of the substrate 10 passes through the center of the core layer 16 to be formed.

Examples of the irradiation light for exposure used herein include visible light, ultraviolet light, infrared light, X-rays, alpha rays, beta rays, gamma rays and the like. Preferably, ultraviolet light is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is generally 10 to 10000 mJ/cm$^2$, preferably 50 to 3000 mJ/cm$^2$.

Figure 3A:
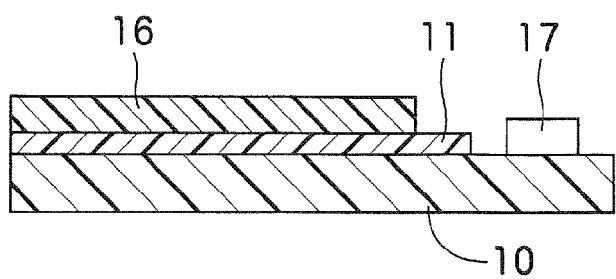
FIG. 3A is a view schematically illustrating a manufacturing step of the above-mentioned optical waveguide device.
Figure 3B:
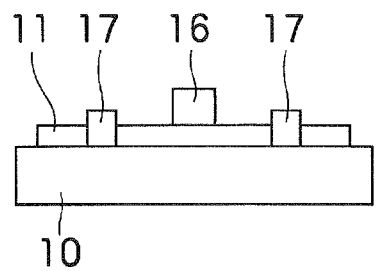
FIG. 3B is a right side view of FIG. 3A.

After the above-mentioned exposure, a heating treatment is performed to complete the photoreaction. This heating treatment is performed at 80° C. to 250° C., preferably at 100° C. to 200° C., for 10 seconds to two hours, preferably for five minutes to one hour. Thereafter, development is performed using a developing solution to dissolve away an unexposed portion (an unhardened portion) of the above-mentioned core formation material layer 12, thereby providing hardened portions of a pattern which matches the above-mentioned opening patterns 13 and 14. A heating treatment is further performed to remove the developing solution remaining in the hardened portions. In this manner, the core layer 16 and the horizontal alignment guides 17 are provided, as shown in FIG. 3A and FIG. 3B which is a right side view thereof.

Exemplary methods to be employed for the development include an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of the core formation material. The heating treatment for the removal of the remaining developing solution is typically performed at 80° C. to 120° C. for 10 to 30 minutes.

The core layer 16 and the horizontal alignment guides 17 which are thus obtained have a thickness typically in the range of 10 to 80 μm and a horizontal width typically in the range of 10 to 500 μm.

Figure 4A:
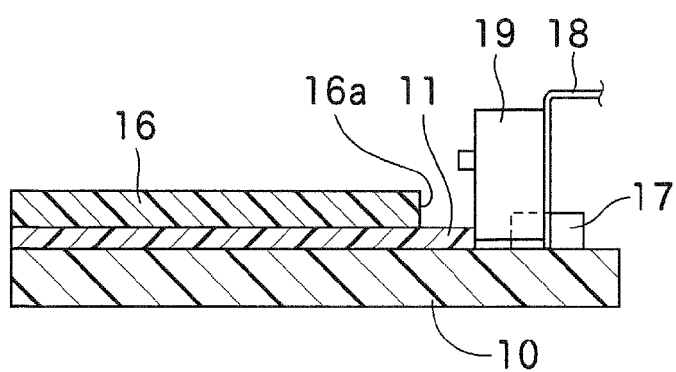
FIG. 4A is a view schematically illustrating a manufacturing step of the above-mentioned optical waveguide device.
Figure 4B:
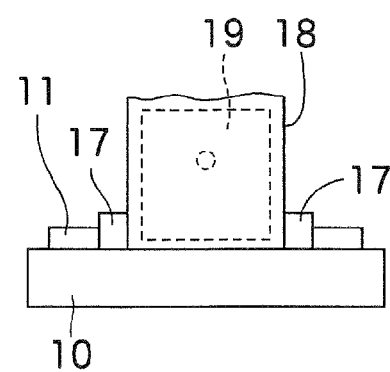
FIG. 4B is a right side view of FIG. 4A.

Next, as shown in FIG. 4A and FIG. 4B which is a right side view thereof, the light emitting element 19 mounted on a flexible printed circuit (FPC) board 18 is fitted between the above-mentioned horizontal alignment guides 17, and is installed on the upper surface of the substrate 10 while being horizontally positioned by the above-mentioned horizontal alignment guides 17. The installation of the above-mentioned light emitting element 19 may be achieved by placing the light emitting element 19 without using an adhesive or be temporarily fixed by using an adhesive in slight amounts. This is because the above-motioned light emitting element 19 is sealed with resin and thereby fixed on the substrate 10 in the subsequent step, which will be described later.

Examples of the above-mentioned light emitting element 19 used herein include a light emitting diode, a laser diode, a VCSEL (Vertical Cavity Surface Emitting Laser) and the like.

Figure 5:
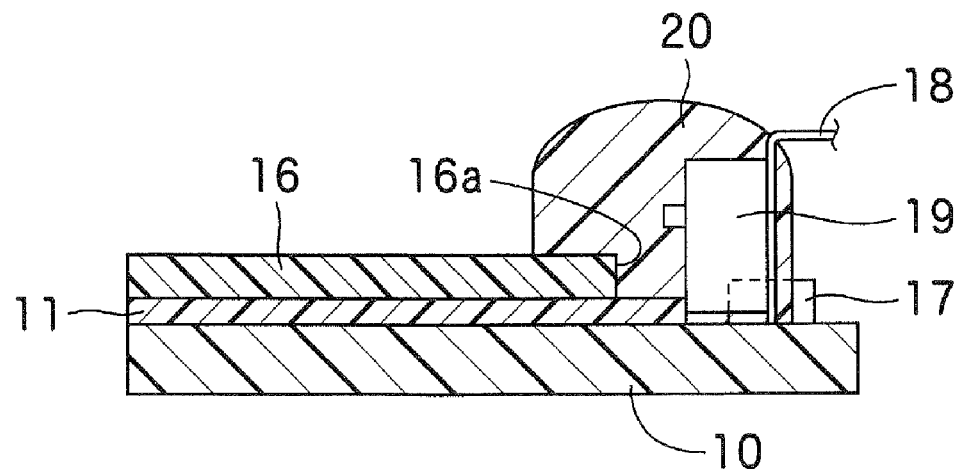
FIG. 5 is a view schematically illustrating a manufacturing step of the above-mentioned optical waveguide device.

A resin material is dripped onto an area extending from the above-mentioned light emitting element 19 to the light receiving surface 16a of the core layer 16 to cover this area therewith, and is then hardened. Thus, as shown in FIG. 5, the area extending from the light emitting element 19 to the light receiving surface 16a of the core layer 16 is sealed with resin, and this area becomes a light propagation layer 20.

The resin for use in the above-mentioned sealing with resin is preferably a resin having a refractive index equal to that of the above-mentioned core layer 16 from the viewpoint of coupling losses because this area becomes the light propagation layer 20. Like the resin material used for the above-mentioned core layer 16, a varnish prepared by dissolving a photosensitive resin in a solvent is typically preferably used for the resin for use in the above-mentioned sealing with resin. It is therefore preferable from the viewpoint of coupling losses and working efficiency to select and use the same material as the above-mentioned core formation material. However, a material having a refractive index higher than that of the under cladding layer 11 and that of the over cladding layer 21 may be used.

A method of hardening the resin material for the above-mentioned sealing with resin is employed as appropriate depending on the type of the used resin, the composition of the resin material and the like. Particularly a method which uses a photosensitive resin as a resin component serving as the resin material and which subjects the photosensitive resin to spot ultraviolet irradiation is preferred. The time required for the spot ultraviolet irradiation is several seconds.

The light propagation layer 20 provided by the above-mentioned sealing with resin is sized to allow the sealing of the light emitting element 19 and the light receiving surface 16a of the core layer 16 while shutting off air therebetween. Typically, the light propagation layer 20 has a thickness (height) of 50 to 100 μm and a diameter of 80 to 200 μm.

Figure 6:
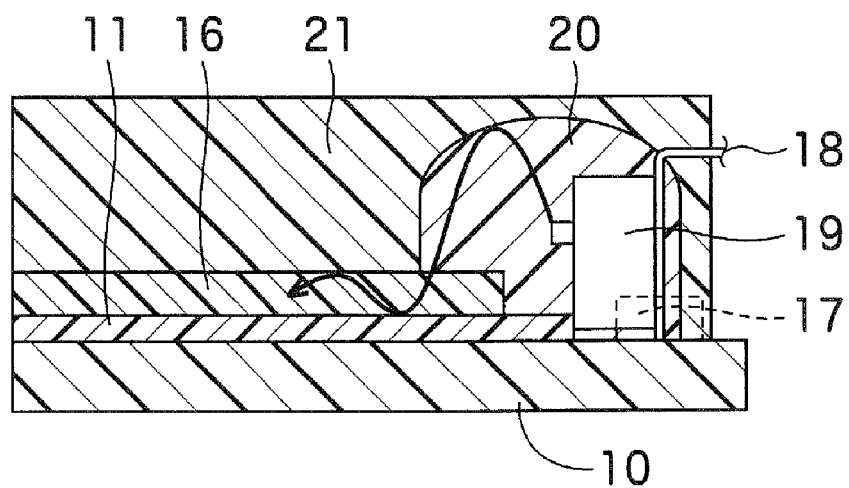
FIG. 6 is a view schematically illustrating a manufacturing step of the above-mentioned optical waveguide device.

Next, as shown in FIG. 6, the over cladding layer 21 is formed over the above-mentioned light propagation layer 20 and the core layer 16. Exemplary materials for the formation of the over cladding layer 21 are similar to those employed for the formation of the above-mentioned under cladding layer 11. The material for the formation of the over cladding layer 21 may be the same as or different from the material for the formation of the aforementioned under cladding layer 11. However, the use of the same material is preferred in the light of designing the optical waveguide.

Examples of the method of forming the above-mentioned over cladding layer 21 include a mold filling method, a coating formation method and the like. Of these, the mold filling method is preferred from the viewpoints of preventing the entry of air bubbles and forming a uniform film thickness. The method of hardening the over cladding layer 21 is similar to the method of hardening the above-mentioned under cladding layer 11. It is particularly preferred to harden the over cladding layer 21 by irradiation with ultraviolet light and post-baking. Preferably, the above-mentioned over cladding layer 21 has a thickness typically in the range of 20 to 100 μm.

From the viewpoints of preventing contamination and preventing damage, it is preferred that the core layer 16 and the light propagation layer 20 under the over cladding layer 21 are completely covered with the above-mentioned over cladding layer 21 when the above-mentioned over cladding layer 21 is formed. However, the formation of the over cladding layer 21 is accomplished without any functional problem if part of or the whole of the core layer 16 and the light propagation layer 20 is exposed or uncovered.

In this manner, the optical waveguide device (see FIG. 1) in which the light emitting element 19 and the optical waveguide are coupled to each other is provided on the upper surface of the substrate 10.

The above-mentioned manufacturing method of the optical waveguide device, which easily and precisely accomplishes the positioning for optical coupling by the use of the horizontal alignment guides 17 formed at the same time as the formation of the core layer 16, provides a high-quality optical waveguide device at low costs. In particular, this manufacturing method is optimum for touch panel applications in which a multiplicity of optical coupling parts are produced at the same time by a photolithographic method.

As in above-mentioned instance, the horizontal positioning is accomplished by using the above-mentioned horizontal alignment guides 17, and the vertical positioning is dispensed with by the formation of the above-mentioned light propagation layer 20. This is preferred because the labor and cost required for the positioning are significantly reduced.

The above-mentioned instance is an instance in which the present invention is applied to the optical waveguide device which provides optical coupling in such a manner that a light beam emitted from the light emitting element 19 enters the core layer 16. The present invention, however, may be applied to an optical waveguide device which provides optical coupling in such a manner that a light beam emitted from the core layer 16 enters a light receiving element.

Next, an example of the present invention will be described. It should be noted that the present invention is not limited to the inventive example to be described below.

EXAMPLE

Material for Formation of Under Cladding Layer and Over Cladding Layer

Materials for the formation of an under cladding layer and an over cladding layer were prepared by mixing together 35 parts by weight of bisphenoxyethanolfluorene diglycidyl ether (component A), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.)(Component B), 25 parts by weight of (3',4'-epoxycyclohexane)methyl-3',4'-epoxycyclohexyl-carboxylate (CELLOXIDE 2081 manufactured by Daicel Chemical Industries, Ltd.) (Component C), and one part by weight of a 50% propione carbonate solution of 4,4-bis[di(β-hydroxyethoxy)phenylsulfinio]phenylsulfide-bis-hexafluoroantimonate (photo-acid generator: component D).

Material for Formation of Core Layer and Light Propagation Layer

A material for the formation of a core layer and a light propagation layer was prepared by dissolving 70 parts by weight of the above-mentioned component A, 30 parts by weight of 1,3,3-tris{4-[2-(3-oxetanyl)]butoxyphenyl}butane and 0.5 part by weight of the above-mentioned component D in 28 parts by weight of ethyl lactate.

Production of Optical Waveguide Device

First, the material for the formation of the under cladding layer was applied to an upper surface of a glass substrate (having a thickness of 1.0 mm) by a spin coating method. Thereafter, the material for the formation of the under cladding layer was irradiated with ultraviolet light at 2000 mJ/cm$^2$. Subsequently, a heating treatment was performed at 120° C. for 15 minutes to form the under cladding layer (having a thickness of 125 μm).

Next, the above-mentioned material for the formation of the core layer was applied to an upper surface of the above-mentioned under cladding layer by a spin coating method. Thereafter, a drying process was performed at 100° C. for 15 minutes. Next, a synthetic silica photomask formed with an opening pattern identical in shape with a core pattern and opening patterns for defining horizontal alignment guides for accomplishing the precise horizontal positioning of a light emitting element relative to the above-mentioned core pattern was placed over the material for the formation of the core layer. Then, exposure by the use of irradiation with ultraviolet light at 3000 mJ/cm$^2$ was performed by a contact exposure method from over the photomask. Thereafter, a heating treatment was performed at 80° C. for 15 minutes. Next, development was carried out using 10% by weight of an aqueous solution of γ-butyrolactone to dissolve away an unexposed portion. Thereafter, a heating treatment was performed at 120° C. for 15 minutes to form the core layer (having the following dimensions in cross section: 12 μm in width×24 μm in height) and the horizontal alignment guides (having dimensions in cross section identical with those of the core layer).

Next, a VCSEL (having the following device size; 300 μm in length×300 μm in width×200 μm in height, and having a light emitting point height of 150 μm) mounted on a FPC board was installed in a space between the above-mentioned horizontal alignment guides on the upper surface of the above-mentioned substrate while being positioned along the horizontal alignment guides, and was temporarily fixed by using an ultraviolet curable adhesive in small amounts.

Then, the above-mentioned material for the formation of the light propagation layer was dripped onto the above-mentioned under cladding layer so as to cover the above-mentioned VCSEL and a light receiving surface of the aforementioned core layer. Thereafter, the above-mentioned material for the formation of the light propagation layer was subjected to spot ultraviolet irradiation at 2000 mJ/cm$^2$ for two seconds. This provided the light propagation layer having a sealing resin height of 70 μm and a diameter of 130 μm.

Next, a mold filling method was used to fill an area overlying the above-mentioned under cladding layer, the core layer and the light propagation layer with the material for the formation of the over cladding layer. Then, the material for the formation of the over cladding layer was irradiated with ultraviolet light at 3000 mJ/cm$^2$. Thereafter, a heating treatment was performed at 120° C. for 15 minutes to form the over cladding layer (having a thickness of 50 μm).

In this manner, an optical waveguide device including the under cladding layer, the core layer, the light propagation layer and the over cladding layer with the VCSEL buried therein was manufactured on the glass substrate.

This optical waveguide device showed that the amount of light having passed through an optical waveguide was 80% of the amount of light obtained when complete alignment was performed by active alignment, thereby achieving low optical coupling losses and high quality.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide device comprising:
   an under cladding layer formed on a portion of an upper surface of a substrate;
   a core layer including a light receiving surface or a light emitting surface and formed on a portion of an upper surface of the under cladding layer;
   a horizontal alignment guide for light receiving and emitting element installation, said horizontal alignment guide being made of the same material as that of said core layer, said horizontal alignment guide being formed on a portion of the substrate where the under cladding layer is not formed on; and
   a light receiving and emitting element installed on the portion of the substrate where the under cladding layer is not formed on along the horizontal alignment guide.

2. The optical waveguide device according to claim 1, wherein the light receiving and emitting element and at least one of the light receiving surface or the light emitting surface of the core layer are sealed with resin, whereby a light propagation layer is formed.

* * * * *